United States Patent
Freese et al.

(10) Patent No.: US 8,870,044 B1
(45) Date of Patent: Oct. 28, 2014

(54) SNACK AND DRINK HOLDER

(75) Inventors: Lawrence O. Freese, Santa Rosa Beach, FL (US); Douglas F. Melville, Jr., Simsbury, CT (US)

(73) Assignee: Brica, Inc., Charlotte, NC (US)

( * ) Notice: Subject to any disclaimer, the term of this patent is extended or adjusted under 35 U.S.C. 154(b) by 572 days.

(21) Appl. No.: 12/751,236

(22) Filed: Mar. 31, 2010

Related U.S. Application Data

(60) Provisional application No. 61/165,130, filed on Mar. 31, 2009.

(51) Int. Cl.
| | |
|---|---|
| B60R 11/00 | (2006.01) |
| B60R 7/00 | (2006.01) |
| B62J 11/00 | (2006.01) |
| B62J 7/00 | (2006.01) |
| B62J 9/00 | (2006.01) |
| A47D 15/00 | (2006.01) |
| A47B 96/06 | (2006.01) |
| E04G 3/00 | (2006.01) |
| F16B 1/00 | (2006.01) |
| G09F 7/18 | (2006.01) |
| E04G 5/06 | (2006.01) |

(52) U.S. Cl.
USPC .......... 224/558; 224/407; 224/414; 224/448; 224/548; 224/551; 224/926; 248/103; 248/104; 248/230.5; 248/228.3; 248/231.41

(58) Field of Classification Search
CPC .................................. A47K 1/09; A47G 5/10
USPC ......... 224/407, 414, 448, 548, 551, 558, 926; 248/103, 104, 230.5, 311.2, 228.3, 248/231.41
See application file for complete search history.

(56) References Cited

U.S. PATENT DOCUMENTS

| | | | | |
|---|---|---|---|---|
| 4,664,365 | A * | 5/1987 | Heine | 269/246 |
| 4,759,535 | A * | 7/1988 | Takasugi | 269/246 |
| 5,560,578 | A * | 10/1996 | Schenken et al. | 248/313 |
| 5,659,904 | A * | 8/1997 | Doczy et al. | 4/577.1 |
| 5,823,486 | A * | 10/1998 | Smith et al. | 248/104 |
| 5,839,711 | A * | 11/1998 | Bieck et al. | 248/313 |
| 5,842,671 | A * | 12/1998 | Gibbs | 248/231.41 |
| 5,996,957 | A * | 12/1999 | Kurtz | 248/311.2 |
| 6,283,042 | B1 * | 9/2001 | Wargo et al. | 108/26 |
| 6,398,175 | B1 * | 6/2002 | Conner et al. | 248/228.3 |
| 6,637,709 | B1 * | 10/2003 | Guenther et al. | 248/311.2 |
| 6,766,912 | B1 * | 7/2004 | Gibbs | 211/74 |
| 7,823,230 | B2 * | 11/2010 | Meyers et al. | 4/577.1 |
| 2004/0021048 | A1* | 2/2004 | Schaal | 248/310 |
| 2004/0222345 | A1* | 11/2004 | Lindsay | 248/311.2 |

* cited by examiner

Primary Examiner — Brian D Nash
Assistant Examiner — Derek Battisti
(74) Attorney, Agent, or Firm — Robert Z. Evora, Esq.; Wade C. Yamazaki

(57) ABSTRACT

A holder for snacks and drinks, in one embodiment adapted to be secured by clamping to a child safety car seat in a vehicle, to a stroller, or to a shopping cart handle, as examples. The holder includes a main body having a front side and a rear side and supporting at least one receptacle for holding food or a drink. A clamp assembly is connected to the main body. The clamp assembly includes a pair of jaws movable relative to each other located generally on the rear side of the main body, and an adjustment knob located generally on the front side of the main body.

4 Claims, 6 Drawing Sheets

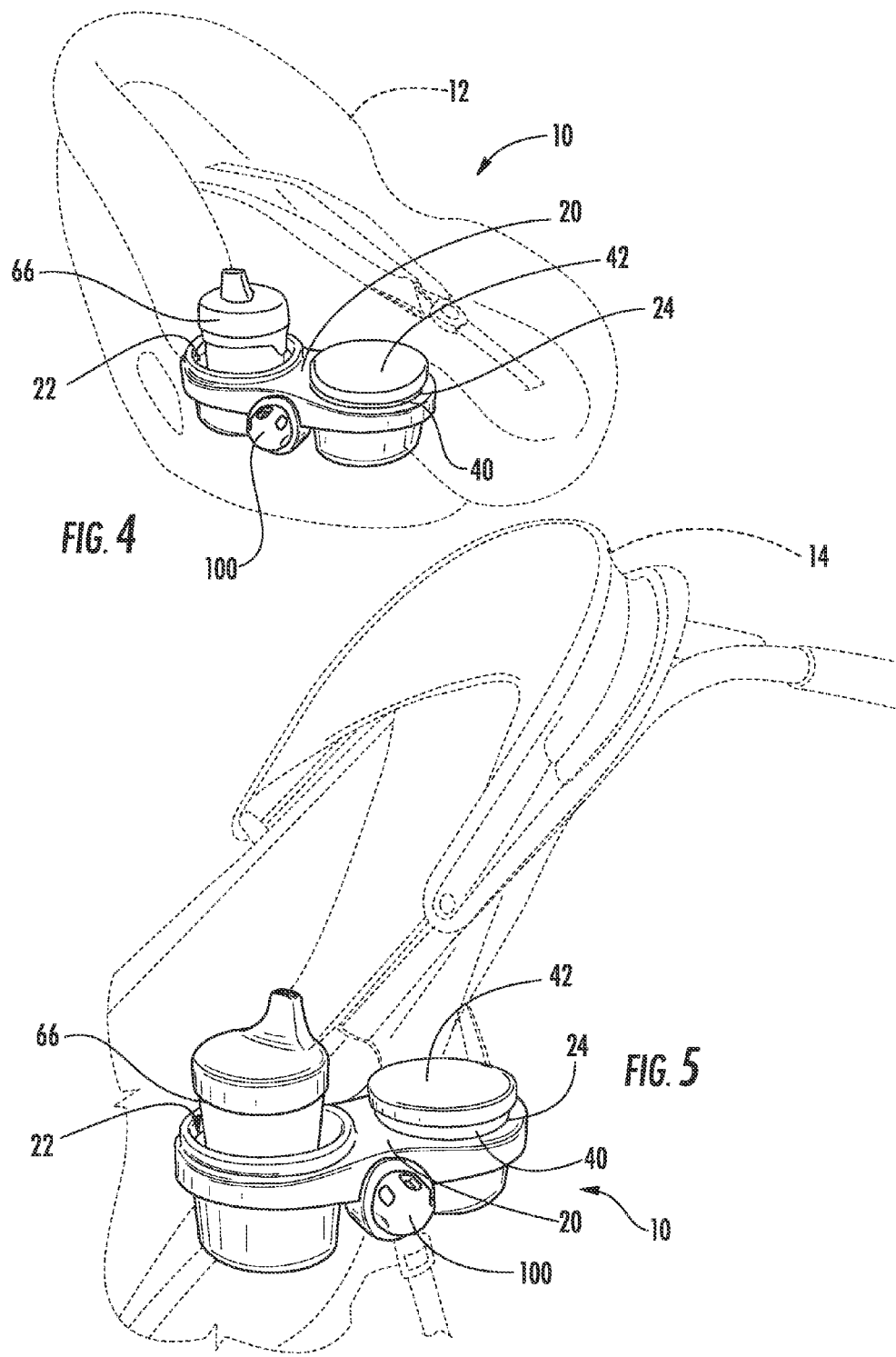

SNACK AND DRINK HOLDER

CROSS-REFERENCE TO RELATED APPLICATION

The benefit of U.S. provisional patent application Ser. No. 61/165,130 filed Mar. 31, 2009 is claimed.

BACKGROUND OF THE INVENTION

The invention relates generally to cup holders and snack holders, such as are used in vehicles.

SUMMARY OF THE INVENTION

In one aspect, a holder for snacks and drinks is provided, the holder being adapted to be secured by clamping to a child safety car seat in a vehicle, to a stroller, or to a shopping cart handle, as examples. The holder includes a main body having a front side and a rear side and supporting at least one receptacle for holding food or a drink. A clamp assembly is connected to the main body. The clamp assembly includes a pair of jaws movable relative to each other located generally on the rear side of the main body, and an adjustment knob located generally on the front side of the main body.

In another aspect, holder for snacks and drinks is provided, for use in a vehicle, or attached to a stroller or to a shopping cart handle, as examples. The holder has a main body, the main body including a top, a bottom, and a circular drink holder aperture. The main body supports at least a drink holder receptacle including a cylindrical sidewall, a bottom, and an open top. A retaining tab ring is located at the top of the drink holder receptacle and includes a plurality of radially inwardly-extending flexible tabs for retaining a drink container in the drink holder receptacle. The drink holder receptacle is attached to the bottom of the main body in alignment with the circular drink holder aperture, with the retaining tab ring being retained between the drink holder receptacle and the bottom of the main body. The cylindrical sidewall has recesses formed therein adjacent the open top for receiving the flexible tabs when deflected by a container.

BRIEF DESCRIPTION OF THE DRAWINGS

FIG. 4 illustrates the combination holder in use attached by clamping to a child safety car seat, as an example;

FIG. 5 illustrates the combination holder in use attached by clamping to a stroller, as another example;

DETAILED DESCRIPTION

Figure 1:
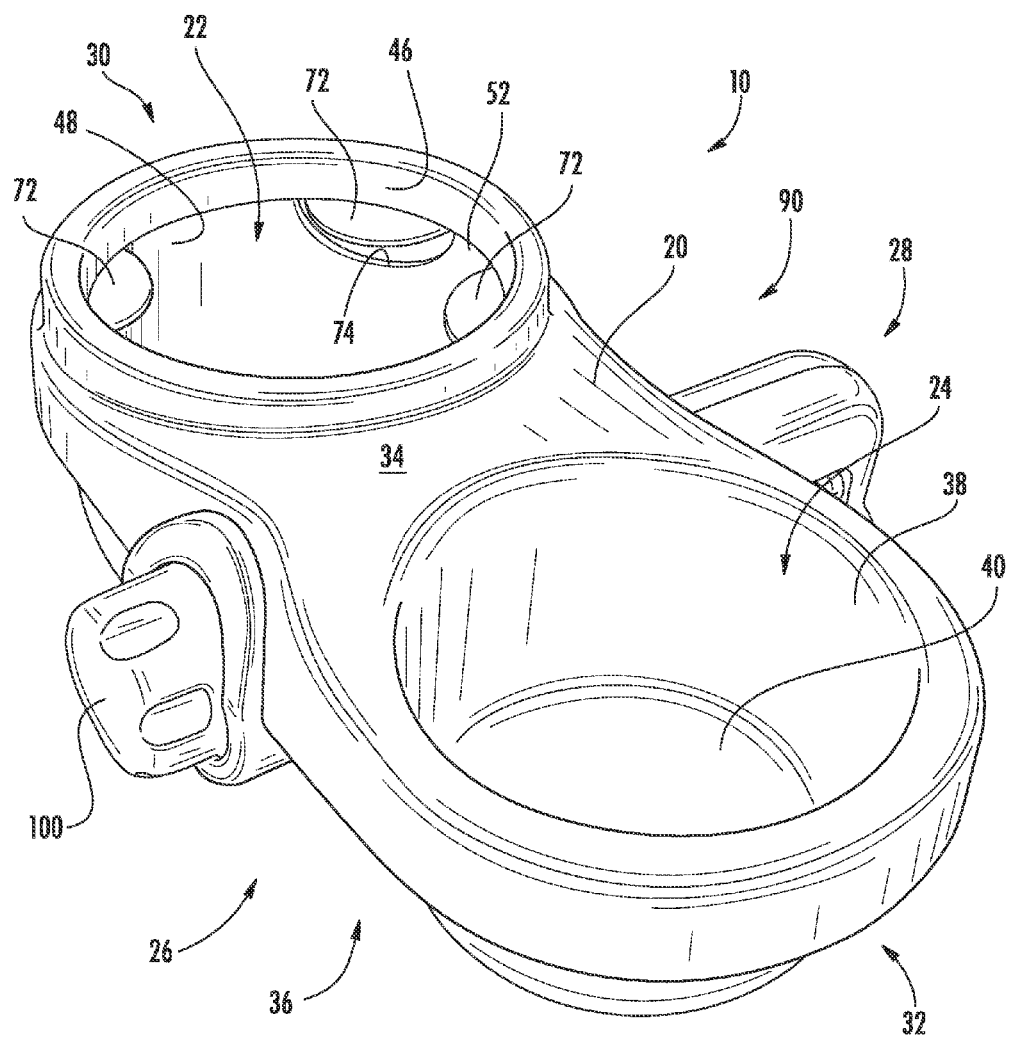
FIG. 1 is a three-dimensional view of a combination snack and drink holder embodying the invention, generally from the snack container end and adjustment knob side (front side) thereof.

With particular reference to FIGS. 1-5, a combination snack and drink holder embodying the invention is generally designated 10. The holder 10 is ergonomically safe for a baby, while providing a holder for snacks and drinks while "on the go." By way of example and not limitation, the holder 10 can be secured or attached by clamping to a child safety car seat 12 (FIG. 4) used in a vehicle, to a stroller 14 (FIG. 5), or to a shopping cart handle (not shown).

The combination holder 10 is generally made of injected molded plastic, and has a main body 20 which supports a drink holder receptacle 22 or recess 22, as well as a snack container receptacle 24 or recess 24. In the illustrated embodiment, the snack container receptacle 24 is integral with the main body 20, while the drink holder receptacle 22 is a separate piece. For purposes of description, the main body 20 has a front side 26, a rear side 28, a drink holder end 30 and a snack container end 32, as well as a top 34 and underside 36 or bottom 36.

The integral snack container receptacle 24 or recess 24 includes a generally cylindrical sidewall 38 and a bottom 40. The snack container receptacle 24, and particularly the diameter thereof, is sized to snuggly receive a flexible plastic snack container 42 shaped like a cup 42. The snack container 42 has a lid 44. The snack container 42, when received in the receptacle 24 or recess 24, is supported by the bottom 40.

The main body 20 includes a circular drink holder aperture 46, and the drink holder receptacle 22 is attached generally to the underside 36 or bottom 36 of the main body 20, generally in alignment with the aperture 46, as described in greater detail hereinbelow with particular reference to FIG. 6.

Figure 2:
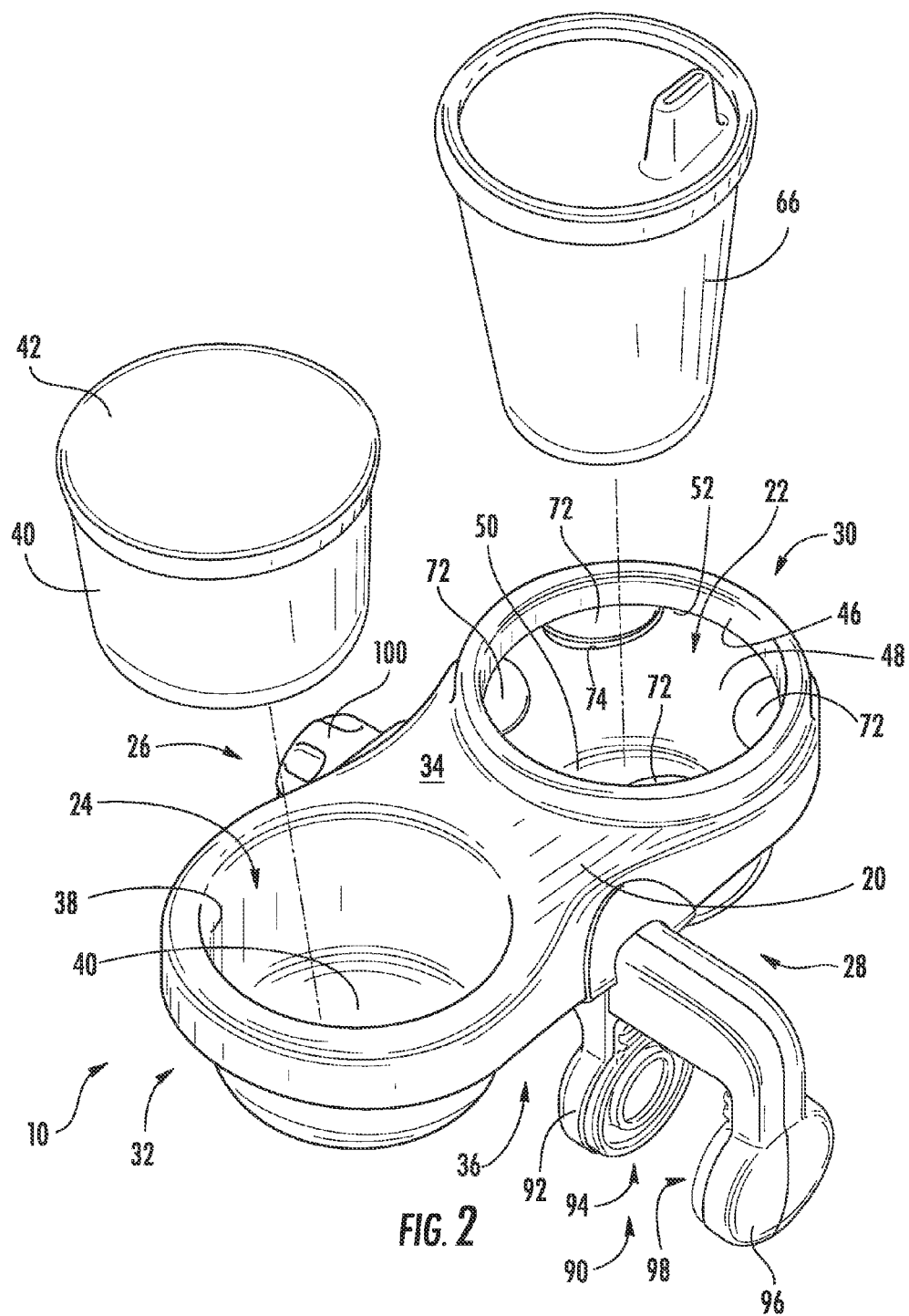
FIG. 2 is a three-dimensional view of the combination holder of FIG. 1, generally from the snack container end and clamp side (rear side) thereof, and also showing, in partially exploded form, a snack cup and a drink container which are received in respective receptacles or cavities.
Figure 3:
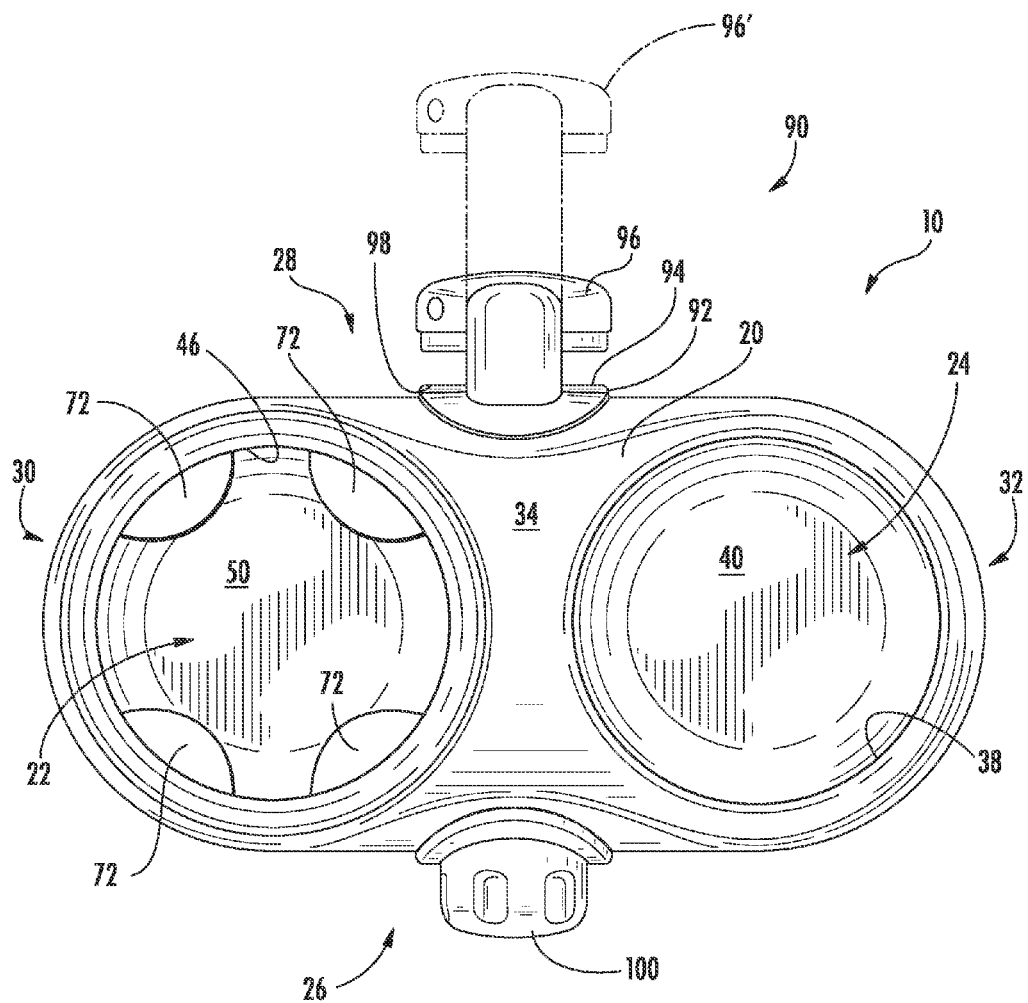
FIG. 3 is a top plan view of the combination holder of FIG. 1, illustrating, in solid lines, the outer movable clamping jaw in its fully closed position, and illustrating, in phantom lines, the outer moveable clamping jaw in its fully open position.
Figure 6:
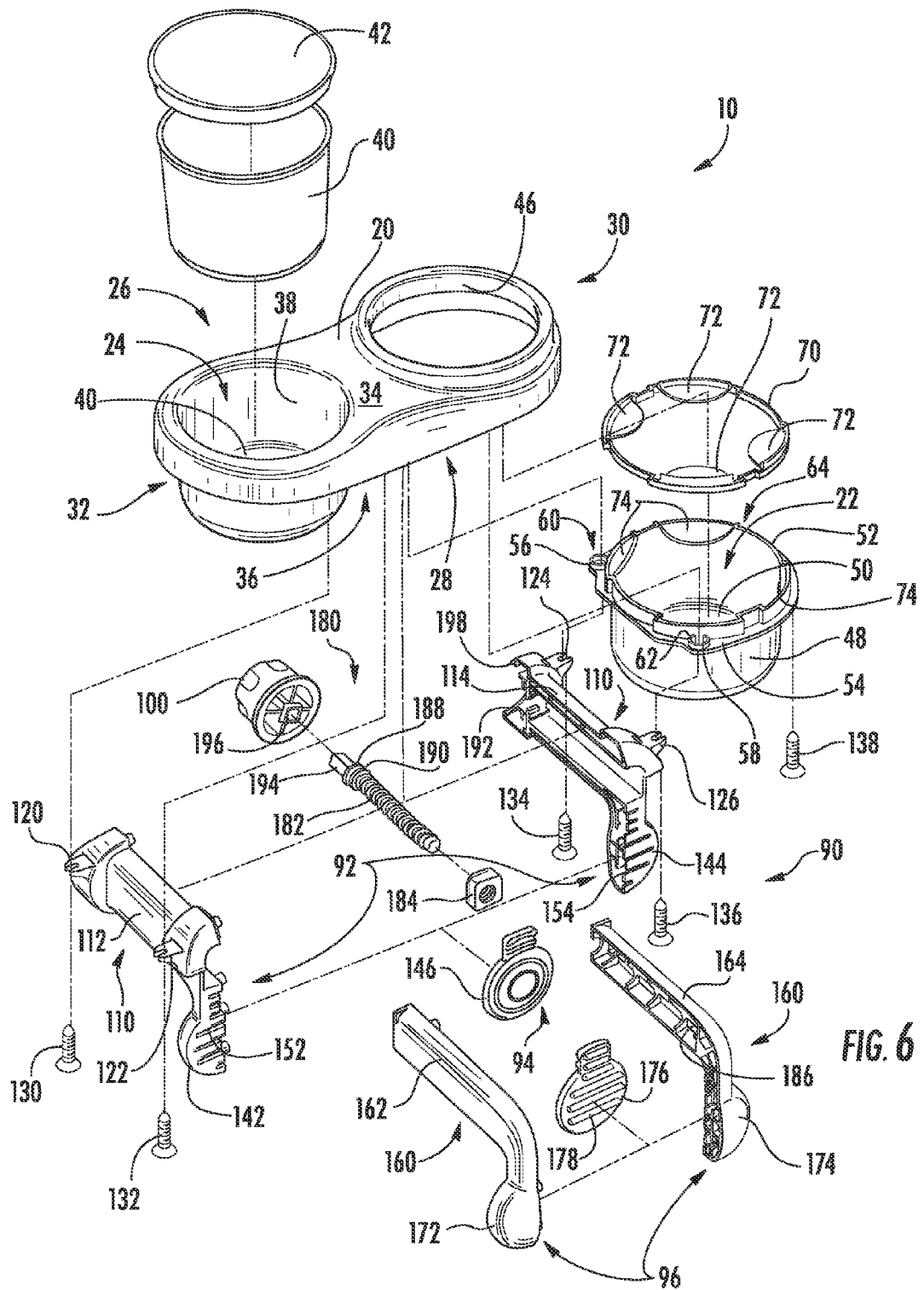
FIG. 6 is an exploded three-dimensional view of the combination holder of FIGS. 1-5, generally from the clamp side (rear side) thereof, in an orientation similar to that of FIG. 2.

With reference to the exploded view of FIG. 6, in addition to FIGS. 1-3, the drink holder receptacle 22 or recess 22 likewise includes a cylindrical sidewall 48, a bottom 50, and an open top 52. The drink holder receptacle 22 includes a mounting flange 54 adjacent to but slightly spaced from the top 52. Projecting upwardly from the flange 54 are the walls of two wells 56 and 58 which receive two corresponding posts (not visible) projecting downwardly from the underside 36 of the main body 20 to provide location reference during assembly. In addition, the walls of the wells 56 and 58 provide spacing when the holder 10 is assembled. The mounting flange 54 has two fastener-receiving apertures hidden by the wells 56 and 58 in the orientation of FIG. 6, generally in the locations indicated by reference numbers 60 and 62. The mounting flange 54 has a third fastener-receiving aperture which is also hidden in the orientation of FIG. 6, generally in the location indicated by reference number 64.

Figure 7A:
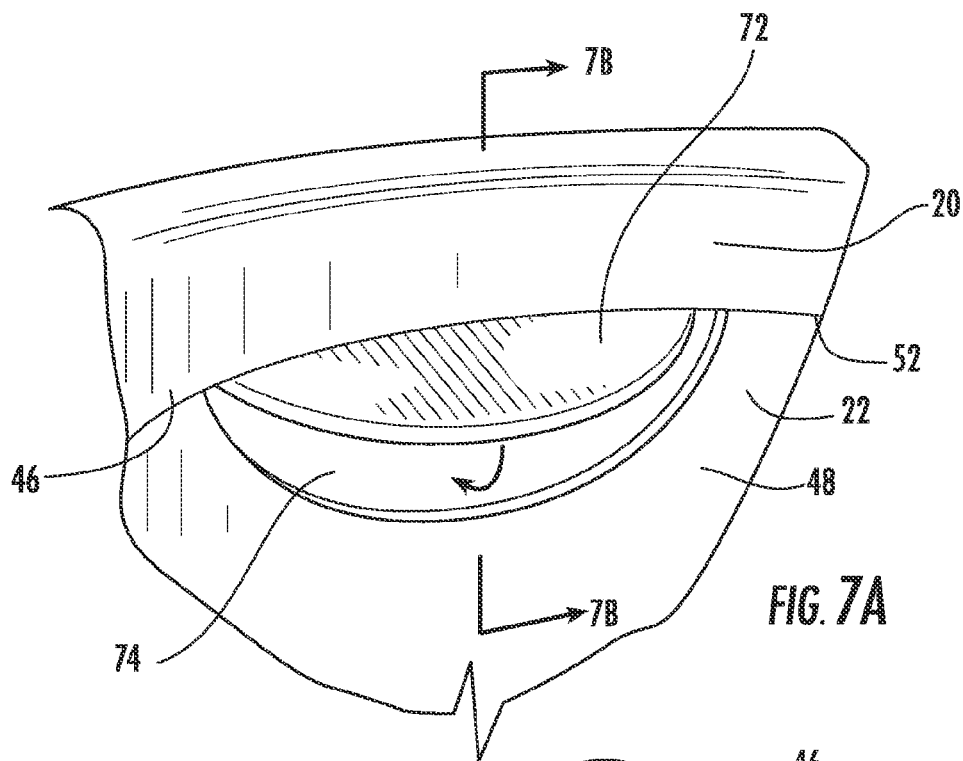
FIG. 7A is an enlarged three-dimensional view of a portion of the cup holder side of the combination holder, illustrating a flexible finger and a recess for receiving the flexible finger when fully deflected.

Unlike the snack container receptacle 24, the drink holder receptacle 22 is intended to securely hold drink containers which may have a smaller diameter than the diameter of the receptacle 22. (Even so, containers which snuggly fit within the drink holder receptacle 22 may as well be accommodated, as described hereinbelow with particular reference to FIGS. 7A and 7B.) Thus, for example, as shown in FIGS. 2, 4 and 5, a baby's nippy cup 66 may be retained within the drink holder receptacle 22. As another example, a rectangular juice box (not shown) may be held within the drink holder receptacle 22.

To accommodate drink containers of different shapes and sizes, a rubber retaining tab ring 70 is provided and includes four radially inwardly-extending flexible tabs 72 for retaining a drink container, such as the exemplary nippy cup 66. It will be appreciated that the flexible tabs 72 deflect as required depending on the size and shape of the particular drink container being held. The ring 70 is generally circular, but has various departures from circular to provide location keying during assembly in a conventional manner, in conjunction with corresponding conventional keying elements (not shown) on the drink holder receptacle 22 near the top 52 thereof, above the mounting flange 54.

Figure 7B:
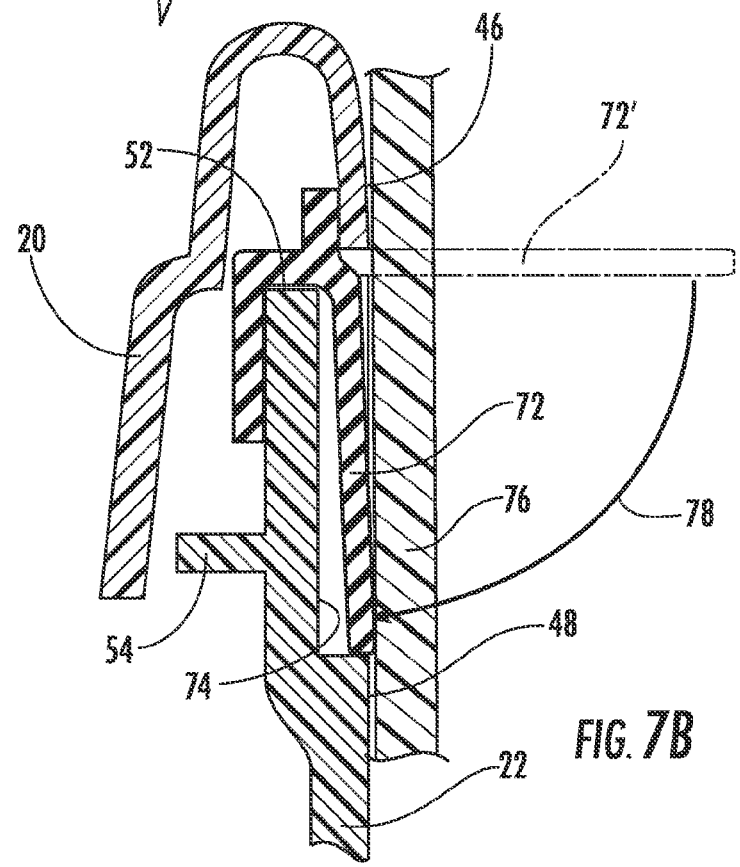
FIG. 7B is a cross-sectional view taken generally on line 7B-7B of FIG. 7A, illustrating, in solid lines, the flexible finger fully deflected and received in the recess, and illustrating, in phantom lines, the flexible finger when undeflected.

As illustrated in the exploded view of FIG. 6, the drink holder receptacle 22 is attached to the underside 36 or bottom 36 of the main body 20 in alignment with the circular aperture 46, with the retaining tab ring 70 being retained or captured generally between the top 52 of the drink holder receptacle 22 and the underside 36 or bottom 36 of the main body 20. FIG. 7B further illustrates the manner in which the retaining tab ring 70 is captured.

Although the drink holder receptacle 22 particularly is intended to hold drink containers which are smaller than the diameter of the cylindrical sidewall 48, as noted above larger diameter containers may as well be accommodated. Thus, and with particular reference to the enlarged detail of FIGS. 7A and 7B, the drink holder receptacle 22 includes recesses 74 formed in the cylindrical sidewall 48 adjacent the open top 52, for receiving the flexible tabs 72 when fully deflected by a container, such as a portion 76 of a representative container 76 shown in FIG. 7B. Reference number 72' in FIG. 7B designates the undeflected position (shown in phantom lines) of the tab 72, while arrow 78 represents deflection movement. In one product configuration (not specifically illustrated), two identical snack containers, such as the snack container 42, may be provided, with one snack container in the snack container receptacle 24, and the other snack container in the drink holder receptacle 22 fully deflecting the tabs 72.

For securing the holder 10, and particularly the main body 20 thereof, to a forward-facing child safety car seat within a vehicle, such as the FIG. 4 car seat 12, to an umbrella stroller, such as the stroller 14 of FIG. 5, or the like, the holder 10 includes a clamp assembly, generally designated 90.

In overview, the clamp assembly 90 is attached to the underside 36 of the main body 20 and includes two jaws movable relative to each other, a fixed inner jaw 92 having an outwardly-facing working surface 94 and a movable outer jaw 96 having an inwardly-facing working surface 98. Thus, the inner jaw 92 is in a fixed position with reference to the main body 20. To control clamping force, a clamping adjustment knob 100 is provided to selectively cause the movable outer jaw 96 to move relative to the fixed inner jaw 92. With particular reference to FIG. 5, in its closest position (solid lines) the outer jaw 96 is within approximately ¼ inch of the inner jaw 92. In a fully open position (phantom lines) the outer jaw, denoted by reference number 96', is approximately two inches from the inner jaw 92. In the illustrated embodiment, the clamping adjustment knob 100 is located generally on what is herein referred to as the front side 26 of the main body 20. The jaws 92 and 96 are located generally on what is herein referred to as the rear side 28 of the main body 20.

More particularly, the fixed inner jaw 92 forms the distal end of an elongated hollow two-part housing 110 having two housing halves 112 and 114. The housing halves 112 and 114 include slotted mounting ears 120, 122, 124 and 126 for attachment to the underside 36 on bottom 36 of the main body 20, for example using connectors such as screws 130, 132, 134, and 136. In the illustrated embodiment, the screws 130 and 132 attach the housing half 112 to the underside 36 or bottom 36 of the main body 20, engaging the slotted mounting ears 120 and 122, respectively. The screws 134 and 136 attach the housing half 114, engaging the slotted mounting ears 124 and 126, respectively, and also passing through the apertures 60 and 62 in the mounting flange 54 to in part attach the drink holder receptacle 22. To complete the attachment of the drink holder receptacle 22, a fifth screw 138 passes through the aperture 64 in the mounting flange 54 of the drink holder receptacle 22.

Accordingly, distal ends 142 and 144 of the housing halves 112 and 114 each define one-half of the structural portion of the fixed inner jaw 92. A resilient inner jaw pad 146 defines the actual outwardly-facing working surface 94. To retain the inner jaw pad 146, the pad 146 has resilient projecting ribs (not visible) which engage corresponding retention recesses 152 and 154 in the faces of the ends 142 and 144.

The movable outer jaw 96 likewise forms the distal end of an elongated hollow two-part clamping adjustment rod 160 having two clamping adjustment rod halves 162 and 164. The clamping adjustment rod 160 is retained within the two halves 112 and 114 of the housing 110, and longitudinally moves or slides with reference to the housing 110. Distal ends 172 and 174 of the clamping adjustment rod 160 halves 162 and 164 each define one-half of the structural portion of the movable outer jaw 96. A resilient outer jaw pad 176 defines the actual inwardly-facing working surface 98.

A clamping mechanism 180, in addition to the clamping adjustment knob 100, includes a lead screw 182 in the form of a threaded shaft 182 which is driven by the clamping adjustment knob 100 and which can rotate within the clamping adjustment rod 160, as well as a square lead screw nut 184 which is retained within a recess 186 defined within the two halves 162 and 164 of the clamping adjustment rod 160 and engages the lead screw 182. The square lead screw nut 184 is restrained both longitudinally and rotationally with reference to the clamping adjustment rod 160. Accordingly, as the lead screw 182 is rotated, the lead screw nut 184 and therefore the clamping adjustment rod 160 move longitudinally relative to the lead screw 182 and relative to the housing 110.

To provide fixed longitudinal positioning while permitting rotation, the lead screw 182 includes a pair of spaced annular ridges 188 and 190 which, when assembled, are located on either side of an apertured and split partition wall 192, with one-half of the partition wall 192 formed as an element of a respective one of the housing halves 112 and 114.

The lead screw 182 has a square keyed end 194 which engages a square aperture 196 in the clamping adjustment knob 100, which is in turn retained by a flange 198 which is part of the elongated housing 110, each half of the flange 198 being formed as an element of a respective one of the housing halves 112 and 114.

Adjustable clamping force is accordingly provided as the lead screw 182 is rotated within the clamping adjustment rod 160 by a user turning the clamping adjustment knob 100. The lead screw 182 is longitudinally positioned with reference to the elongated housing 110 (which has the fixed inner jaw 92 as its distal end) by the annular ridges 188 and 190 engaging the split partition wall 192, and the lead screw nut 184 is longitudinally positioned with reference to the clamping adjustment rod 160 (which has the movable outer jaw 96 as its distal end) by the lead screw nut 184 retained within the recess 186, restrained both longitudinally and rotationally with reference to the clamping adjustment rod 160.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A holder for snacks and drinks adapted to be secured by clamping to a child safety car seat in a vehicle, to a stroller, or to a shopping cart handle, the holder comprising:
   a main body having a front side and a rear side and supporting at least one receptacle for holding food or a drink; and
   a clamp assembly connected to the main body, the clamp assembly including:
      an inner jaw and an outer jaw movable relative to each other located generally on the rear side of the main body, the inner jaw in fixed position with reference to the main body, and the outer jaw movable with reference to the main body,
      an adjustment knob located generally on the front side of the main body, the adjustment knob having an concentrically projecting rim,
      an elongated hollow housing having a housing distal end and supporting the inner jaw at the housing distal end, the hollow housing having a flange to retain and longitudinally secure the concentrically projecting rim of adjustment knob,
      a hollow clamping adjustment rod within and which longitudinally moves with reference to the hollow housing, the hollow clamping adjustment rod having an adjustment rod distal end and supporting the outer jaw at the adjustment rod distal end, and
      a clamping mechanism including:
         a lead screw within the hollow clamping adjustment rod and driven by the adjustment knob, wherein the lead screw and adjustment knob remain longitudinally fixed relative to the hollow housing during rotation of the lead screw; and
         a lead screw nut retained within the hollow clamping adjustment rod and threadedly engaging the lead screw for longitudinal movement of the lead screw nut and the hollow clamping adjustment rod with reference to the hollow housing and the lead screw is rotated by the adjustment knob.

2. The holder of claim 1, which comprises:
   a drink holder receptacle; and wherein
   the main body includes a top and bottom, and a circular drink holder aperture; wherein
   the drink holder receptacle includes a cylindrical sidewall, a bottom, and an open top; the holder further comprising
      a retaining tab ring located at the top of the drink holder receptacle and including a plurality of radially inwardly-extending flexible tabs for retaining a drink container in the drink holder receptacle,
      the drink holder receptacle being attached to the bottom of the main body in alignment with the circular drink holder aperture, with the retaining tab ring being retained between the drink holder receptacle and the bottom of the main body, and
      the cylindrical sidewall having recesses formed therein adjacent the open top for receiving the flexible tabs when deflected by a container.

3. A clamp assembly comprising: a main body having a front side and a rear side and supporting at least one receptacle for holding an item; an elongated hollow housing having a housing distal end and supporting a fixed inner jaw at the housing distal end; a hollow clamping adjustment rod within and which longitudinally moves with reference to the hollow housing, the hollow clamping adjustment rod having an adjustment rod distal end and supporting a movable outer jaw at the adjustment rod distal end; and a clamping mechanism, the clamping mechanism including: a lead screw within the hollow clamping adjustment rod and rotationally driven by an adjustment knob, the adjustment knob having a concentrically projecting rim engaging a flange within the hollow housing, wherein the lead screw has at least one annular ridge engaging an internal projection within the hollow housing, causing the lead screw and adjustment knob to remain longitudinally fixed relative to the hollow housing during rotation of the lead screw, and a lead screw nut retained within the hollow clamping adjustment rod and threadedly engaging the lead screw for longitudinal movement of the lead screw nut and the hollow clamping adjustment rod with reference to the hollow housing as the lead screw is rotated by the adjustment knob.

4. The clamp assembly of claim 3, wherein the adjustment knob is located adjacent an end of the elongated hollow housing opposite the housing distal end.

* * * * *